(12) United States Patent
Bruls et al.

(10) Patent No.: US 9,041,709 B2
(45) Date of Patent: May 26, 2015

(54) SALIENCY BASED DISPARITY MAPPING

(71) Applicant: Koninklijke Philips N.V., Eindhoven (NL)

(72) Inventors: Wilhelmus Hendrikus Alfonsus Bruls, Eindhoven (NL); Bart Koon, Eindhoven (NL); Patrick Luc Els Vandewalle, Oud-Turnhout (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/354,940

(22) PCT Filed: Oct. 23, 2012

(86) PCT No.: PCT/IB2012/055829
§ 371 (c)(1),
(2) Date: Apr. 29, 2014

(87) PCT Pub. No.: WO2013/064938
PCT Pub. Date: May 10, 2013

(65) Prior Publication Data
US 2014/0313191 A1 Oct. 23, 2014

Related U.S. Application Data

(60) Provisional application No. 61/553,984, filed on Nov. 1, 2011.

(51) Int. Cl.
*G06T 15/00* (2011.01)
*G06T 15/04* (2011.01)
*H04N 13/00* (2006.01)

(52) U.S. Cl.
CPC ............ *G06T 15/04* (2013.01); *H04N 13/0022* (2013.01)

(58) Field of Classification Search
CPC ................... G06T 7/0075; G06T 2207/10021; G06T 2207/20021; G06T 2207/10012; G06T 2207/10028; G06T 2200/04; G06T 5/40; H04N 13/0239; H04N 2013/0081; H04N 13/0018; H04N 13/0022; H04N 2213/005; H04N 1/4074; G09G 2320/0285; G09G 3/003; G06K 9/6212
USPC ........................................................ 345/419
See application file for complete search history.

(56) References Cited

U.S. PATENT DOCUMENTS 7,161,614 B1 1/2007 Yamashita
2011/0181593 A1 7/2011 Hirai
(Continued)

FOREIGN PATENT DOCUMENTS

WO 2005060271 A1 6/2005

OTHER PUBLICATIONS

Lang, Manuel et al "Nonlinear Disparity Mapping for Stereoscopic 3D", ACM Transactions on Graphics, vol. 29, No. 4, Jul. 2010.
Viola, Paul et al "Robust-Real-Time Object Detection", Second International Workshop on Statistical and Computational Theories of Vision, Modeling, Learning, Computing and Sampling, Jul. 2001.
(Continued)

*Primary Examiner* — Kee M Tung
*Assistant Examiner* — Haixia Du

(57) ABSTRACT

A three dimensional [3D] image signal is processed for rendering 3D image data (33) on a specific 3D display, e.g. an auto-stereoscopic display. A first depth map (34) and saliency of the 3D image data are determined. A display depth sub-range (35) of a usable depth range (36) of the 3D display is determined and provides a higher 3D image quality for a viewer than the 3D image quality across the usable depth range. A depth mapping function is determined in dependence of the saliency data. The depth mapping function maps the first depth map to a second depth map for generating views for the 3D display. Advantageously the salient range of depth values is mapped towards the display depth sub-range.

10 Claims, 5 Drawing Sheets

(56) References Cited

U.S. PATENT DOCUMENTS

| 2011/0194756 | A1  | 8/2011 | Morifuji |        |
|--------------|-----|--------|----------|--------|
| 2012/0033051 | A1* | 2/2012 | Atanassov et al. | 348/49 |
| 2012/0162200 | A1* | 6/2012 | Mishima et al. | 345/419 |
| 2012/0176371 | A1  | 7/2012 | Morifuji |        |
| 2012/0219208 | A1  | 8/2012 | Ishiyama |        |

OTHER PUBLICATIONS

Chang, Che-Han et al "Content-Aware Display Adaptation and Interactive Editing for Stereoscopic Images", IEEE Transactions on Multimedia, 2011.

Chamaret, Christel et al "Adaptive 3D Rendering based on Region-of-Interest", Thomson Corporate Research, SPIE 2010.

Scharstein, Daniel et al "A Taxonomy and Evaluation of Dense Two-Frame Stereo Correspondence Algorithms", International Journal of Computer Vision, vol. 47, 2002, Technical Report MSR-TR-2001-81.

Shibata, Takashi et al "The Zone of Comfort: Predicting Visual Discomfort with Stereo Displays", Journal of Vision, 2011, vol. 11, No. 8, pp. 1-29.

High-Definition Multimedia Interface Specification Version 1.4A Extraction of 3D Signaling Portion, Mar. 2010.

Blu-Ray Disc, White Paper Blu-Ray Disc Format, 2.B Audio Visual Application Format Specifications for BD-ROM, Mar. 2005.

\* cited by examiner

SALIENCY BASED DISPARITY MAPPING

CROSS-REFERENCE TO PRIOR APPLICATIONS

This application is the U.S. National Phase application under 35 U.S.C. §371 of International Application PCT/IB2012/055829, filed on Oct. 23, 2012, which claims the benefit of U.S. Provisional Patent Application No. 61/553,984, filed on Nov. 1, 2011. These applications are hereby incorporated by reference herein.

FIELD OF THE INVENTION

The invention relates to a method of processing a three dimensional [3D] image signal for rendering 3D image data on a 3D display based on multiple display views.

The invention further relates to a 3D video device, a 3D image signal and a computer program.

The invention relates to the field of processing 3D image data to improve rendering on a 3D display device. In particular a depth map, either available or generated, is processed for improving the 3D experience on a particular 3D display. Image data here includes video data, and is usually processed in two spatial dimensions, whereas time in video data may be used as a third dimension.

BACKGROUND OF THE INVENTION

The document "Adaptive 3D Rendering based on Region-of-Interest, by Christel Chamaret, Sylvain Godeffroy, Patrick Lopez, Olivier Le Meur, at Thomson Corporate Research, 1 Avenue de Belle-Fontaine 35576 Cesson-Sevigne France" discloses 3D video processing techniques, in particular high disparity management. High disparity currently has strong impact on viewing 3D scenes on stereoscopic screens. Salient regions of the scenes are commonly called Region-Of-Interest in the image processing domain. The 3D experience is amended by applying some effects related to the Region-Of-Interest. In particular the shift between the two views is adaptively adjusted in order to have a null disparity on the Region-Of-Interest area in the scene.

SUMMARY OF THE INVENTION

The document above discloses modifying the disparities in image data by applying disparity shift between the left and right view so that the main region of interest has zero disparity. Due to said shift other areas in the image data will get higher disparity than the original data. Such disparities may be beyond the disparity range that the human visual system can comfortably process in a 3D experience, and may lead to visual discomfort, fatigue or diplopia (double vision). The document proposes to apply blurring, e.g. selectively blur a background part of the image, to hide such discomforting areas. Also, due to shifting a high disparity region of interest to zero disparity, a relatively large shift needs to be applied. Hence a problem of the known method is that the 3D experience of the image is reduced.

It is an object of the invention to provide processing of 3D image data for improving rendering 3D image data having high disparities while avoiding reducing the image quality.

For this purpose, according to a first aspect of the invention, the method as described in the opening paragraph comprises, deriving, from the 3D image signal, a first depth map comprising first depth values, deriving, from the 3D image signal, saliency data representing saliency in an amount of the 3D image data, the saliency being indicative of salient elements having a salient range of depth values, determining a display depth sub-range, the display depth sub-range being a sub-range of a usable depth range of the 3D display and providing a higher 3D image quality for a viewer than the 3D image quality across the usable depth range, determining a depth mapping function for the amount of the 3D image data in dependence of the saliency data such that first depth values in the salient range are mapped towards the display depth sub-range, converting the first depth map into a second depth map by the depth mapping function, and generating the display views in dependence of the second depth map.

For this purpose, according to a further aspect of the invention, a 3D video device for processing a 3D image signal for rendering 3D image data on a 3D display based on multiple display views, comprises input means for deriving, from the 3D image signal, a first depth map comprising first depth values, and for deriving, from the 3D image signal, saliency data representing saliency in an amount of the 3D image data, the saliency being indicative of salient elements having a salient range of depth values, and a video processor arranged for determining a display depth sub-range, the display depth sub-range being a sub-range of a usable depth range of the 3D display and providing a higher 3D image quality for a viewer than the 3D image quality across the usable depth range, determining a depth mapping function for the amount of the 3D image data in dependence of the saliency data such that first depth values in the salient range are mapped towards the display depth sub-range, converting the first depth map into a second depth map by the depth mapping function for generating the display views in dependence of the second depth map.

For this purpose, according to a further aspect of the invention, a 3D image signal for rendering 3D image data on a 3D display based on multiple display views, comprises meta data including saliency data representing saliency in an amount of the 3D image data, the saliency being indicative of salient elements having a salient range of depth values, for enabling, in a 3D video device, deriving, from the 3D image signal, a first depth map comprising first depth values, determining a display depth sub-range, the display depth sub-range being a sub-range of a usable depth range of the 3D display and providing a higher 3D image quality for a viewer than the 3D image quality across the usable depth range, determining a depth mapping function for the amount of the 3D image data in dependence of the saliency data such that first depth values in the salient range are mapped towards the display depth sub-range, and converting the first depth map into a second depth map by the depth mapping function for generating the display views in dependence of the second depth map.

The measures have the effect of modifying the disparities so that disparities between the views rendered on a particular display are within a usable range of disparities. The usable range may also be called a stereoscopic comfort zone, i.e. the range of disparity values in stereoscopic rendering that can be comfortably processed by the human visual system into a 3D experience. Moreover, saliency data in the 3D image data is used to determine a salient range of elements of interest in the image, and such elements are mapped on a depth sub-range of the 3D display that has a high 3D image quality.

The method is for processing a 3D image signal for rendering 3D image data on a 3D display based on multiple display views. Such a display may for example be an auto-stereoscopic display that generates multiple views in a viewing beam, dimensioned to provide a pair of views to the left and right eye of the viewer. A first depth map is derived from the 3D image signal. Also, saliency data representing saliency in an amount of the 3D image data is derived from the image signal. The amount may be a single image or video frame, or a sequence of video fields or frames, such as e.g. the frames corresponding to a predetermined period of time, a shot, an encoding unit such as a Group of Pictures (GOP in MPEG encoding), etc. Using several consecutive frames, or several non-consecutive frames representative of a shot, such as a start-frame or start and end frame, a better approximation of the salient and non-salient data can be obtained.

The saliency data may be included in the signal as metadata, or may be derived by locally processing an amount of 3D image data. The saliency is indicative of salient elements, i.e. parts of the image that will get the attention of the human viewer. The salient parts of the image have a salient range of depth values, i.e. a range of depth values of those image parts that have a high probability of getting the attention and focus of the viewer. Saliency for example may be based on brightness, contrast and/or color differences, and, in part, based on depth differences, e.g. protrusion. Also, the type of subject, e.g. human faces, may be detected and used for saliency. As such, various methods for determining salient elements in image data are known to those skilled in the art.

The invention is also based on the following recognition. The inventors have seen that, for a particular display, there is a display depth sub-range of the usable depth range of the respective 3D display, which has a higher 3D image quality for a viewer than the 3D image quality across the whole usable depth range. The sub-range may be inherent to the type of display, or may be adjusted for a particular viewer, e.g. a child, or may be a preference set by the viewer. Also, the sub-range may be selected to have a low level of crosstalk between views, whereas the crosstalk across the usable range may be larger.

The depth mapping function is determined to map said amount of the 3D image data in dependence of the saliency data. The depth mapping function is so dimensioned to map the further depth values, i.e. non-salient values for non-salient parts of the image, to substantially remain in the usable range of the display. The depth mapping function is applied to the original, first depth values and generates adapted depth values such that first depth values in the salient range are changed towards depth values in the display depth sub-range. In practical circumstances, in dependence of the actual image content, substantially all depth values may be mapped into the selected sub-range or at least a shift towards the sub-range is achieved for at least a part of the salient depth values. By the mapping the salient elements are moved, in the depth direction, towards the high quality range of the respective display, whereas other parts of the image substantially retain depth values in the usable range of the display. Finally the depth mapping function is applied to the amount of 3D image data for converting the first depth map into a second, final depth map, and the display views are generated in dependence of the second depth map. Advantageously it is avoided to move a major salient object to zero disparity, because depth values of such object will only be moved towards said sub-range and therefore will not be forced all the way to zero disparity.

It is noted that in this document depth values and depth maps also include disparity values and disparity maps. The actual representation of a depth may be a value in the depth value range or the disparity value range used by a specific system, e.g. 0-255 where high values are close to the viewer and zero is infinity. Alternatively a range of disparity values around zero may be used, e.g. −512 to +511, where negative digital values may represent disparities in front of a display screen and zero is the plane of the screen. Alternatively, a positive disparity d may represent an object far away, using the relation: $xR=xL-dL$. Disparity value may correspond to actual shifts in pixels, or may have a different scale or resolution. Hence, where depth based values and/or processing is mentioned, such terms should be construed to also cover a disparity based representation. In general disparity is typically based on 1/Z, Z being the depth. In detail, the relation with Z is well known but complex (e.g. based on epipolar geometry with parallel cameras). For typical (small) input disparity ranges of typical content the relation between depth and disparity is close to linear. For example, the steps of converting the first depth map into a second depth map by the depth mapping function, and generating the display views in dependence of the second depth map, may be combined by directly generating views having the modified, mapped disparities.

Optionally the saliency data is a saliency map indicating a degree of saliency for pixels of the image. The degree of saliency may be on a binary scale, e.g. 0 or 1, or intermediate values may be used. A range of depth values may be determined for the respective salient pixels. Optionally the saliency data is a saliency depth range. The range may be determined separately, e.g. during production or preprocessing of the 3D image data or 3D video.

Optionally deriving saliency data comprises deriving meta data from the 3D image signal, the meta data representing the saliency data of the 3D image data. Advantageously the source of the 3D image data, e.g. a movie studio, may determine the saliency and include the meta data regarding the saliency in the 3D video signal.

Optionally the depth mapping function comprises making a first histogram for salient pixels and a second histogram for non salient pixels; and determining a salient depth range based on the first histogram and mapping the salient depth range inside the display depth sub-range, and mapping the second histogram on the usable depth range. The histogram gathers the number of pixels having substantially equal depth in respective bins, and so quantifies the depth distribution. The salient range is determined taking boundary depth values in the histogram into account so that at least a majority, e.g. 90%, of the values are within the range.

Optionally the depth mapping function comprises making a combined histogram for salient pixels and non salient pixels, the salient pixels having a first input conversion and the non-salient pixels having a second input conversion, the first input conversion having a correction function in dependence of the sub-range with respect to the usable range; and mapping the combined histogram depth range inside the display usable depth range, the correction function being so that the first depth values in the salient range are warped towards the display depth sub-range. The salient and non-salient values are both entered in a combined histogram, while applying a different input conversion. For example, the non-salient pixels are just entered into the histogram, i.e. a unity input conversion is applied. When for example the sub-range is 0.25× the usable range (i.e. 25% of the usable range), the first input conversion may have a linear correction function of 4. Subsequently the mapping is based on having the combined histogram depths inside the usable range. Advantageously, by in fact magnifying the salient depths by said correction function, the salient depths will substantially fall in the sub-range.

Optionally the amount of 3D image data is a period of a 3D video signal, and the depth mapping function depends on the saliency data across time. The depth mapping function is determined for said period, or at most changes slowly during said period. Advantageously the human visual system is not disturbed by frequent changes in the depth perspective. In particular, the depth mapping function may comprise determining a shot as the period of the 3D video signal and setting the mapping function for the shot, or using a moving window having a look-ahead and setting the mapping function for the window.

Optionally the video processor is arranged for generating the display views in dependence of the second depth map. Optionally the device comprises a 3D display for displaying the display views for the respective left and right eyes of a viewer. Optionally, the video processor is arranged for determining the display depth sub-range by acquiring display capability information from a 3D display device connected to the 3D video device.

Optionally, deriving saliency data comprises deriving meta data from the 3D image signal, the meta data representing the saliency data of the 3D image data.

Further preferred embodiments of the method, 3D devices and signal according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described may have the same references.

DETAILED DESCRIPTION OF EMBODIMENTS

It is noted that the current invention may be used for any type of 3D image data, either still picture or moving video. The system processes a depth map provided in the 3D image data. The depth map may be either originally present at the input of the system, or may be generated as described below, e.g. from left/right frames in a stereo (L+R) video signal or from 2D video. 3D image data is assumed to be available as electronic, digitally encoded, data. The current invention relates to such image data and manipulates the image data in the digital domain.

There are many different ways in which 3D video data may be formatted and transferred, called a 3D video format. Some formats are based on using a 2D channel to also carry stereo information. For example the left and right view can be interlaced or can be placed side by side and above and under. Alternatively a 2D image and a depth map may be transferred, and possibly further 3D data like occlusion or transparency data. Any method of providing or transferring the 3D image data, such as internet or a Blu-ray Disc (BD), may provide the 3D video data.

Figure 1:
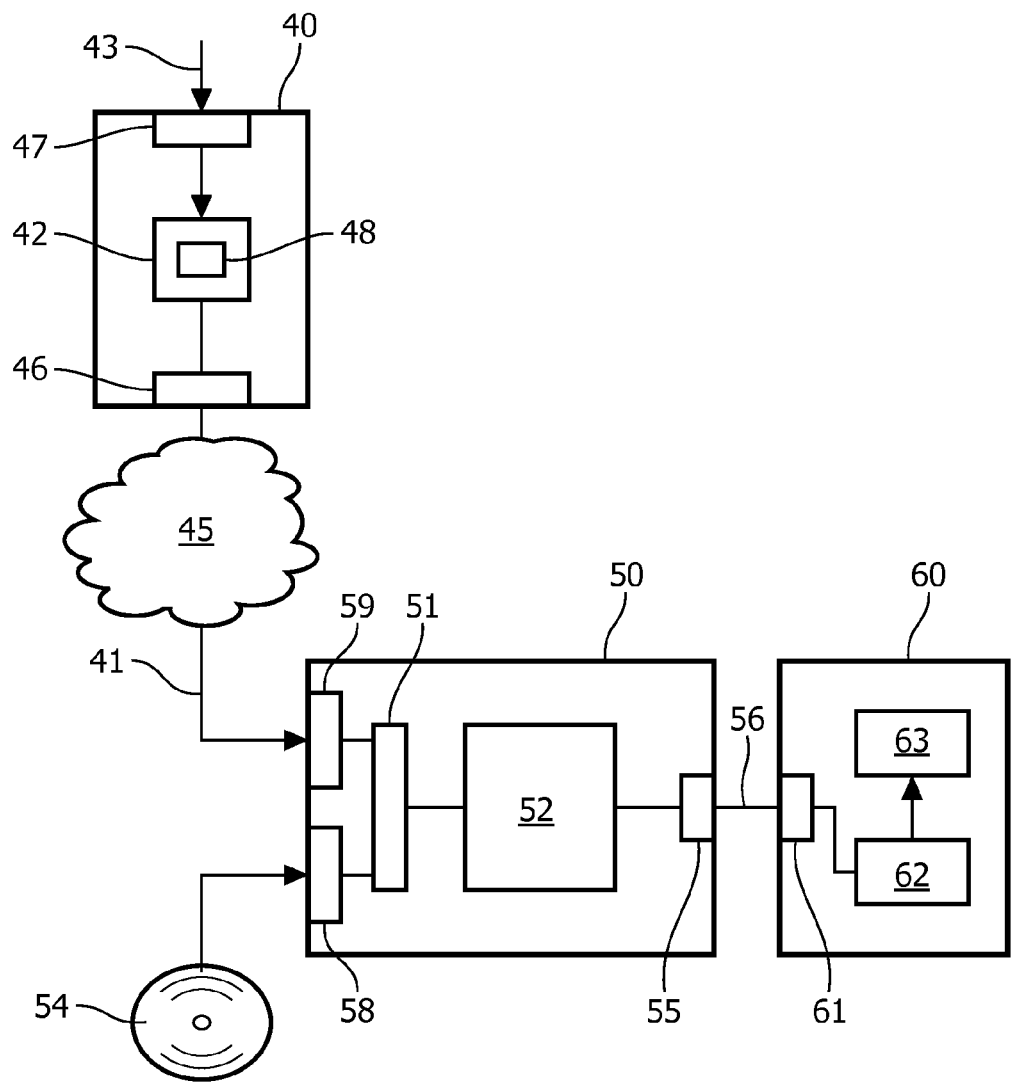
FIG. 1 shows a device for processing 3D image data in a system for displaying 3D image data.

FIG. 1 shows a device for processing 3D image data in a system for displaying 3D image data. A first 3D video device 40, called 3D source, provides and transfers a 3D video signal 41 to a further 3D image processing device 50, which is coupled to a 3D display device 60 for transferring a 3D display signal 56.

FIG. 1 further shows a record carrier 54 as a carrier of the 3D video signal. The record carrier is disc-shaped and has a track and a central hole. The track, constituted by a pattern of physically detectable marks, is arranged in accordance with a spiral or concentric pattern of turns constituting substantially parallel tracks on one or more information layers. The record carrier may be optically readable, called an optical disc, e.g. a CD, DVD or BD (Blu-ray Disc). The information is embodied on the information layer by the optically detectable marks along the track, e.g. pits and lands. The track structure also comprises position information, e.g. headers and addresses, for indication the location of units of information, usually called information blocks. The record carrier 54 carries information representing digitally encoded 3D image data like video, for example encoded according to the MPEG2 or MPEG4 encoding system, in a predefined recording format like the DVD or BD format.

The 3D source has a processing unit 42 for processing 3D video data, received via an input unit 47. The input 3D video data 43 may be available from a storage system, a recording studio, from 3D camera's, etc. A video processor 42 generates the 3D video signal 41 comprising the 3D video data. The source may be arranged for transferring the 3D video signal from the video processor via an output unit 46 and to a further 3D video device, or for providing a 3D video signal for distribution, e.g. via a record carrier. The 3D video signal is based on processing input 3D video data 43, e.g. by encoding and formatting the 3D video data according to a predefined format via an encoder 48.

The 3D source may be a server, a broadcaster, a recording device, or an authoring and/or production system for manufacturing optical record carriers like the Blu-ray Disc. Blu-ray Disc provides an interactive platform for distributing video for content creators. Information on the Blu-ray Disc format is available from the website of the Blu-ray Disc association in papers on the audio-visual application format, e.g. http://www.blu-raydisc.com/Assets/Downloadablefile/2b_bdrom_audiovisualapplication_030 5-12955-15269.pdf. The production process of the optical record carrier further comprises the steps of providing a physical pattern of marks in tracks which pattern embodies the 3D video signal that may include 3D saliency meta data, and subsequently shaping the material of the record carrier according to the pattern to provide the tracks of marks on at least one storage layer.

The 3D image processing device 50 has an input unit 51 for receiving the 3D video signal 41. For example the device may include an optical disc unit 58 coupled to the input unit for retrieving the 3D video information from an optical record carrier 54 like a DVD or Blu-ray disc. Alternatively (or additionally), the device may include a network interface unit 59 for coupling to a network 45, for example the internet or a broadcast network, such device usually being called a set-top box. The 3D video signal may be retrieved from a remote website or media server as indicated by the 3D source 40. The 3D image processing device may be a converter that converts an image input signal to an image output signal having the required disparity. Such a converter may be used to convert different input 3D video signals for a specific type of 3D display, for example standard 3D content to a video signal suitable for auto-stereoscopic displays of a particular type or vendor. In practice, the device may be a 3D optical disc player, or a satellite receiver or set top box, or any type of media player.

The 3D processing device has a processing unit 52 coupled to the input unit 51 for processing the 3D information for generating a 3D display signal 56 to be transferred via an output interface unit 55 to the display device, e.g. a display signal according to the HDMI standard, see "High Definition Multimedia Interface; Specification Version 1.4a of Mar. 4, 2010", the 3D portion of which being available at http://hdmi.org/manufacturer/specification.aspx for public download. The processing unit 52 is arranged for generating the image data included in the 3D display signal 56 for display on the display device 60.

The 3D display device 60 is for displaying 3D image data. The device has an input interface unit 61 for receiving the 3D display signal 56 including the 3D video data transferred from the 3D player 50, for example a 3D player. The transferred 3D video data is processed in processing unit 62 for displaying on a 3D display 63, for example a dual or multi-view LCD. The display device 60 may be any type of stereoscopic display, also called 3D display.

The video processor in the 3D video device, i.e. the processor units 52 in the 3D video device 50, for example a 3D video device, is arranged for executing the following functions for processing the 3D video signal. The 3D video signal is received by the input means 51,58,59, which provides the 3D image data comprising at least a first depth map, and image data. It is again noted that a disparity map, in this text, is also considered to be a type of depth map. For example the first depth map may be generated from a stereo (L+R) input signal by disparity estimation. The first depth map has first depth values and the image comprising image values in a two-dimensional array of pixel. It is noted that the depth map also has a two-dimensional array of pixels, and corresponds to the image, although the depth map may have a different resolution.

The video processor 62 in the 3D display device 60 is arranged for processing the 3D video data for generating display control signals for rendering multiple views. The views may be generated from the 3D image data using a depth map.

In a first embodiment of the system the video processor 62 is arranged for processing of the 3D image signal for rendering 3D image data on the 3D display based on multiple display views. The input processing includes deriving, from the 3D image signal, a first depth map comprising first depth values, and deriving, from the 3D image signal, saliency data representing saliency in an amount of the 3D image data. The saliency is indicative of salient elements having a salient range of depth values. The depth map and/or saliency data may be generated at the source of the 3D image data, such as a movie studio, and then be transferred with the 3D image signal, or may be generated in a 3D player device or in a 3D display device.

The saliency is indicative of salient elements, i.e. parts of the image that will get the attention of the human viewer. The salient parts of the image have a salient range of depth values, i.e. a range of depth values of those image parts that have a high probability of getting the attention and focus of the viewer. Saliency for example may be based on brightness, contrast and/or color differences, and/or on depth differences, e.g. protrusion. Also, the type of subject, e.g. human faces, may be detected and used for saliency. As such, various methods for determining salient elements in image data are known.

For example, in order to detect faces, we may apply a known face detector, see for example "P. Viola and M. Jones, Robust Real-time Object Detection, Second International Workshop On Statistical And Computational Theories Of Vision—Modeling, Learning, Computing, and Sampling; Vancouver, Canada, Jul. 13, 2001". We may detect in particular large faces as they are most salient; smaller faces may be ignored. For frontal faces, such detection is typically quite robust, meaning that such a frontal face will be detected in most of the frames.

Other saliency measures than a face detector can also be included. This could be specific object detectors, but could also be a 'standard' saliency measure indicating the parts of the image to which the viewer's attention is drawn. The output of multiple detectors can be combined if they are associated with the same salient depth range ($d_{min}^S, d_{max}^S$), or handled separately if they do not. In the remaining description, we will assume a single salient depth range, but all descriptions apply equally well for the general case.

For including the saliency meta data in the 3D image data the respective 3D format may be enhanced by defining an additional data structure or message to be transferred within the constraints of the 3D format, such as the BD video format or the HDMI interface format mentioned above. For example, the saliency meta data may include a salient range of depth or disparity values, or an indication of one or more salient regions in the image data, e.g. a saliency map. Optionally, the saliency meta data may include a specific mapping function, or specific parameters, to be used for the enhanced disparity mapping as described below. For example a specific relation, one of more sub-ranges or offset values may be provided to be used during mapping. The saliency meta data may also be specified for a specific period of the 3D image data, e.g. for a number of frames, a Group Of Pictures as encoded (GOP in MPEG encoding), a scene or a shot of a 3D video signal, etcetera, and may include data on temporal boundaries or transitional moments where the disparity mapping may be adjusted, or periods that the mapping must remain fixed, or mapping may not be applied at all. The offset metadata may be included for several different target 3D display systems, e.g. a first set of salient data for an auto-stereoscopic display with a relatively small sub-range and a second set for a stereoscopic display having a larger sub-range.

Furthermore, the processing includes determining a display depth sub-range. The display depth sub-range is a sub-range of a usable depth range of the 3D display and provides a higher 3D image quality for a viewer than the 3D image quality across the usable depth range. The sub-range may be a predetermined range which is determined for the respective type of display, and may be retrieved via a digital interface to the display, or via a look-up table. For example, the sub-range may be transferred as part of the display EDID data. Hence the display depth sub-range may be determined by acquiring display capability information from the 3D display device 60 connected to the processing device, e.g. to receive an amended depth map or multiple views.

Optionally, the sub-range may be set or adjusted for a particular viewer, e.g. a child, or may be a user preference entered by the viewer. For example, the sub-range is a range where objects will have a high sharpness, whereas objects beyond the sub-range have less sharpness or may blur. An auto-stereoscopic display usually has such a sub-range. Also, the sub-range may be selected to have a low level of crosstalk between views, whereas the crosstalk across the usable range may be larger. Stereoscopic displays, e.g. using active shutter glasses, may be prone to such crosstalk.

The processing further includes determining a depth mapping function for the amount of the 3D image data in dependence of the saliency data such that first depth values in the salient range are mapped towards the display depth sub-range. Finally, the first depth map is converted into a second depth map by the depth mapping function and the display views are generated in dependence of the second depth map.

Alternatively the video processor 52 in the 3D processing device 50, for example a 3D player device, or the processing unit 42 in the 3D source device, may be arranged to perform said depth map processing. The saliency data, and/or the second depth map, and/or the multiple views generated for the specified 3D display, may be transferred with the 3D image signal towards said 3D display.

The 3D image signal processing may further include generating the first depth map from a 2D video signal, for converting 2D video into 3D video known as such. Said providing of the 3D video signal comprises receiving a 2D video signal comprising a sequence of 2D video frames, and generating the first depth map based on processing the sequence of 2D video frames. It is noted that depth maps so generated often are of limited quality, and filtering and enhancing the depth map may substantially improve said quality. The function of generating the depth map may be implemented in the input unit 51 of the 3D player, or in the video processor 62 in the 3D display device 60, or in the processing unit 42 in the 3D source device.

In an embodiment the first depth map is generated, e.g. by the video processor 52 in the 3D player device 50, or the processing unit 62 in the 3D display device. A depth map generator, in operation, receives a stereo 3D signal, also called left-right video signal, having a time-sequence of left frames L and right frames R representing a left view and a right view to be displayed for respective eyes of a viewer for generating a 3D effect. The unit then generates the first depth map by disparity estimation of the left view and the right view, and may further provide a 2D image based on the left view and/or the right view. The disparity estimation may be based on motion estimation algorithms used to compare the L and R frames. Large differences between the L and R view of an object are converted into depth values before or behind the display screen in dependence of the direction of the difference. The output of the generator unit is the first depth map. It is noted that other input units may be used to provide the first depth map and the corresponding 2D image data.

Figure 2:
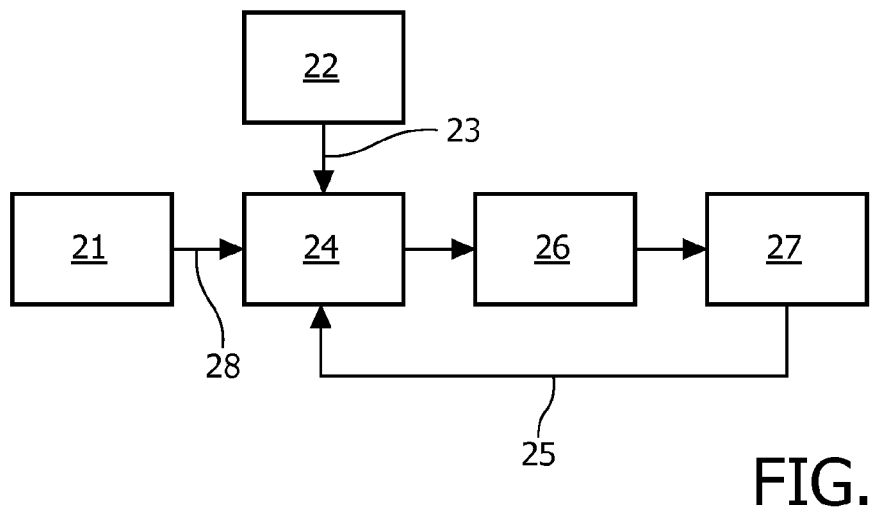
FIG. 2 shows a system overview of disparity mapping, FIG. 3 schematically shows a prior art disparity mapping, FIG. 4 schematically shows enhanced disparity mapping.

FIG. 2 shows a system overview for disparity mapping. A disparity estimator 21 provides a first disparity map 28 based on 3D image data. A saliency detector 22 provides saliency data 23 based on detecting salient elements in the 3D image data. In disparity mapping unit 24 the first disparity map is modified based on a target disparity sub-range 25 that is detected for the 3D display 27. The sub-range may be predetermined for a specific type of display such as a particular auto-stereoscopic display, and may be communicated via an interface, or may be set or adjusted by a viewer based on preferences. Finally a view renderer 26 generates multiple views, i.e. at least a left and a right view for a stereoscopic display, or a set of consecutive views for a auto-stereoscopic type of display. It is noted that the functions schematically indicated in FIG. 2 correspond to steps in a method for processing 3D video, e.g. implemented in a computer program, when executed on a signal processing system, or a general purpose computer.

Disparity estimation as such is known, for example from "D. Scharstein and R. Szeliski, A taxonomy and evaluation of dense two-frame stereo correspondence algorithms, International Journal of Computer Vision, 47(1/2/3):7-42, April-June 2002". When accurately estimated and stored, disparity values allow for an adaptation of the depth effect for stereoscopic content. This can be useful for example in adapting stereoscopic content for viewing on a display with different size, or for viewing on multi-view auto-stereoscopic displays. Warping of the disparity range without explicit computation of a disparity map was investigated in "M. Lang, A. Hornung, O. Wang, S. Poulakos, A. Smolic, and M. Gross, Nonlinear Disparity Mapping for Stereoscopic 3D, Proc. ACM SIGGRAPH, 2010".

Currently it has been recognized that, when viewing 3D content on an autostereoscopic display, it is important to warp the input depth range to the depth range so that the result looks good on the specific type of display. It has been noted that only a specific sub-range may be sufficiently sharp for comfortable viewing on a lenticular display. Sharpness decays gradually with increasing depth away from the screen plane, while still producing usable 3D effect across a usable range of depths.

At the same time, when viewing content on such a display, it becomes clear that certain objects or parts of the video are more disturbing when they become blurred than others. Or in other words, the sharpness requirements for a salient object (e.g. a face) are stricter than for a less/not salient object (e.g. a forest in the background).

Figure 3:
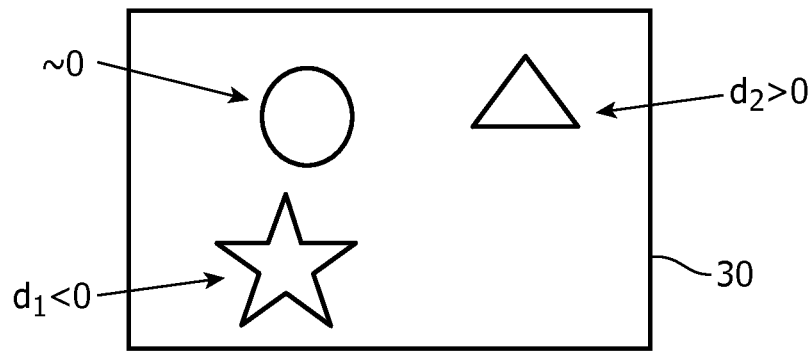
Figure 3:
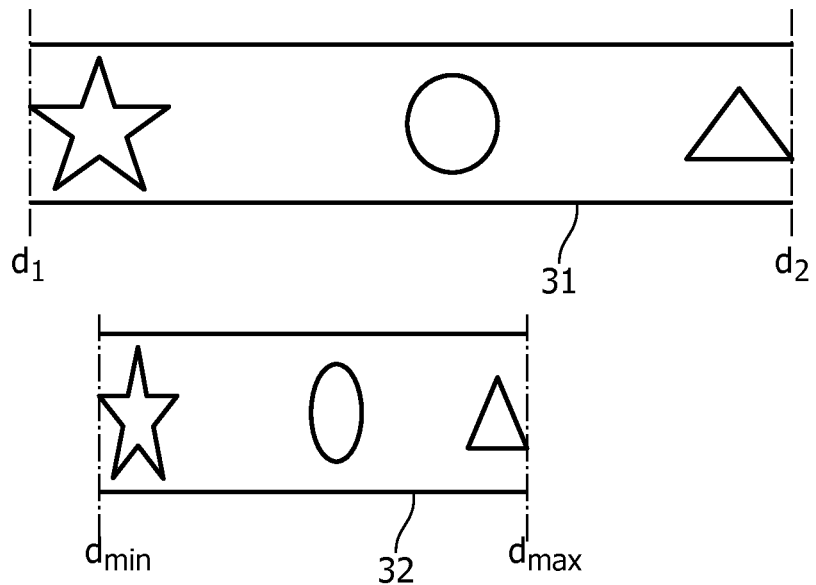

FIG. 3 schematically shows a prior art disparity mapping. The top section shows a 3D image 30 having three elements, a circle having little disparity, a triangle having a positive disparity ($d_2>0$) and a star having a negative disparity ($d_1<0$), i.e. being closest to the viewer. The mid section shows an input range 31 of disparity values, which is larger than the usable range 32 of disparity values of the display, indicated by $d_{min}$ to $d_{max}$, that is shown in the bottom section. The prior art disparity mapping just compresses the input range to fit in the usable range.

As indicated in "The zone of comfort: Predicting visual discomfort with stereo displays", by T. Shibata, et al., Journal of Vision 2011, Jul. 21, 2011, vol. 11, no. 8, article 11, hereby incorporated by reference, a difference exists between natural viewing and Stereo 3D viewing. In natural viewing the vergence stimulus and focal stimulus are consistent, whereas for Stereo 3D viewing this is not the case. Stereo 3D viewing creates inconsistencies between vergence and focal distances because the vergence distance varies depending on the image contents while the focal distance remains constant.

The above paper further indicates that although cinematographers tend to use rules to limit display disparity in practice, there is no real consensus on the exact definition of the comfort zone. For example mention is made of a percentage rule which states that crossed disparity (nearer than the screen should not exceed 2-3% of the screen width, whereas uncrossed disparity should not exceed 1-2% of the screen width. The authors of the paper further observed that some refinement of this percentage rule may be in order and further indicated that the boundaries are not hard boundaries, but in fact continuous.

With regard to autostereoscopic displays the inventors observed that when increasing the depth of a stereoscopic image, starting at a 3D stereo image as close as possible to a 2D image, that it is possible to increase disparity over a certain interval (and therewith the 3D effect) without significantly affecting the perceived sharpness of the stereo image. When further increasing the disparity sharpness of the stereoscopic image deteriorates but the perceived 3D effect increases. At a certain point a further increase of the display disparity will no longer increase the 3D effect, but may in fact reduce the perceived 3D effect.

The inventors further noted a difference in the above for salient and non-salient objects. The inventors noted that regardless of the precise delimitation of the comfort zone, a difference appears to exist in tolerance for acceptable disparities for salient objects and for non-salient objects. Based on this insight it was possible to obtain a perceptual improvement of the stereoscopic perception of 3D stereo images when salient objects were mapped to regions with smaller disparity values (towards zero), i.e. onto the depth range that allows sharper image rendering. For non-salient objects this did not appear as critical, as a result the non-salient object may be mapped onto larger disparity values, e.g. to the entire comfort zone, with a limited impact on perceived quality.

Paraphrasing, preferably salient objects are mapped onto a sub-range of the comfort zone. This sub-range can be perceived as a subset of the comfort zone having tighter quality requirements than the comfort zone. By placing the salient objects in this subset of the display disparity range, salient objects may be rendered at a higher perceived sharpness than the non-salient objects.

Figure 4:
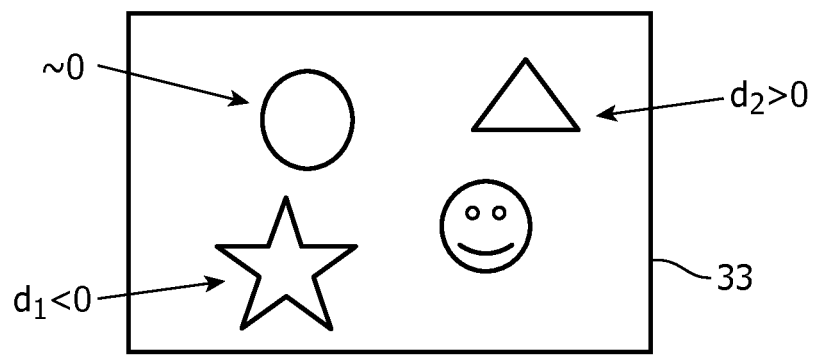
Figure 4:
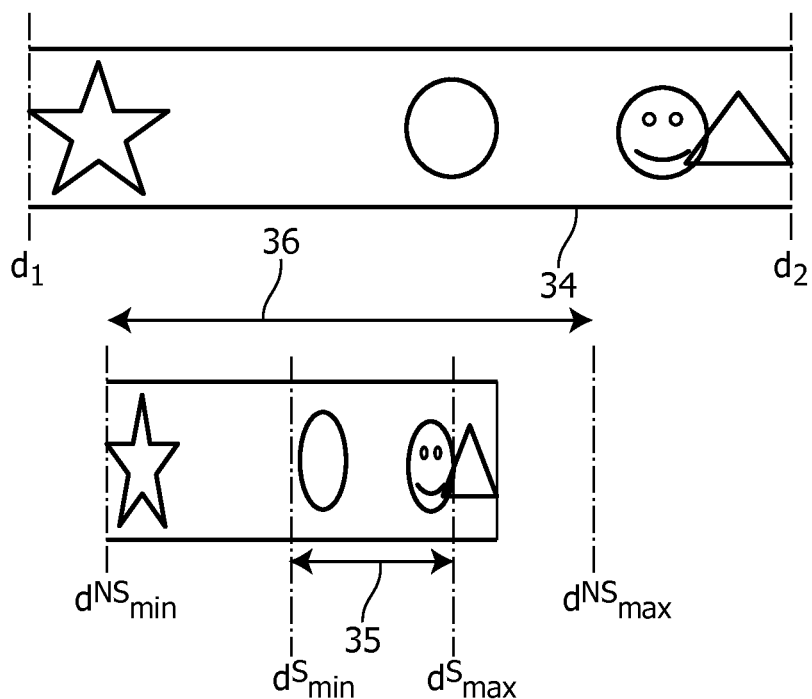

FIG. 4 schematically shows enhanced disparity mapping. The top section shows a 3D image 33 having four elements, a circle having little disparity, a triangle having a positive disparity ($d_2 > 0$) and a star having a negative disparity ($d_1 < 0$), i.e. being closest to the viewer, and a face close to the triangle. The mid section shows an input range 34 of disparity values. The bottom section shows a second disparity map, i.e. after saliency based disparity mapping. Now a usable range 36 of disparity values of the display has been determined that is available for non-salient parts of the image, indicated by $d^{NS}_{min}$ to $d^{NS}_{max}$ which is shown in the bottom section. A sub-range 35 is suitable for salient parts of the image, indicated by $d^{S}_{min}$ to $d^{S}_{max}$. It is assumed that the face is detected to be a salient element. The saliency based mapping as described below uses a disparity mapping function that maps the disparity values of the face towards the sub-range. The second disparity map shows that the face is now displayed in the sub-range 35.

Hence the enhanced mapping is based on object saliency which motivates variable requirements for the disparity mapping. Instead of using a single range of usable disparities to warp to, a specific sub-range is used for mapping the salient parts. In practice, the use of two depth ranges, i.e. said sub-range and the full usable range, already gives very nice improvements, whereas the depth range to use is determined based on one or multiple saliency estimators.

In an embodiment, we use two depth ranges, where one is a sub-range that is for the more salient regions such as typically faces and the other for less salient regions such as scenery. Assume we have defined the two disparity ranges:

($d^{NS}_{min}$, $d^{NS}_{max}$) usable for non-salient (NS) regions,
($d^{S}_{min}$, $d^{S}_{max}$) sub-range for salient (S) regions (e.g. faces).

Typically the sub-range is (much) smaller than the first range. It should be appreciated that for display systems that use an intermediate depth representation, the usable range may be specified in this intermediate representation. When for instance display settings are adjusted such that the entire depth range can be used for non-salient regions, then we should define $d^{NS}_{min} = 0$ and $d^{NS}_{max} = 255$ steps. In that case, for salient regions, it could be, for instance, that $d^{S}_{min} = 64$ and $d^{S}_{max} = 192$ steps. In practice, the ranges could be determined based on viewing tests with representative content. Inside the depth-rendering display, the intermediate depth representation may be converted to disparities as part of the view synthesis procedure.

Input disparity values $d^S$ and $d^{NS}$ from the salient and non-salient regions may be combined into a single histogram as follows. The conversion is done by defining an operator $\phi(d)$ that transforms disparities from the salient range ($d^{S}_{min}$, $d^{S}_{max}$) to the non-salient range ($d^{NS}_{min}$, $d^{NS}_{max}$), such that $\phi(d^{S}_{min}) = d^{NS}_{min}$ and $\phi(d^{S}_{max}) = d^{NS}_{max}$. Usually disparity ranges are centered on zero, and the operator may be $\phi(d) = cd$ with c a constant. It is noted that other functions may be appropriately selected. For a sequence of frames in order, we update a histogram of disparities, taking pixel saliency into account. For each pixel p with disparity d:

$h(d) += 1$ i.e. $h(d) = h(d) + 1$, if p is a non-salient pixel,
$h(\phi(d)) += 1$ if p is a salient pixel.

We then map towards the target disparity range by selecting a low (e.g. 2) and high (e.g. 98) percentile from the histogram, and map said range to the target range.

In a further embodiment, the temporal stability for depth conversion is increased. Histograms are calculated and used as described above, but additionally the histogram for the current frame $h_N$ is recursively combined with a weighted version of the histogram $H_{N-1}$ used in the previous frame:

$$H_N = \alpha H_{N-1} + h_N,$$

where $\alpha$ is close or equal to 1 for frames within a shot and close or equal to 0 directly after a shot transition. In an optional improvement, the value of $\alpha$ depends on the number of frames since the last shot transition, possibly taking into account the amount of image variation and the estimated probability of a past or upcoming shot transition.

A practical embodiment has the following functions; all values are examples. For the example we assume that we have an input video with depth/disparity, and salient elements like faces have been detected. Hence, the image is divided into salient pixel(s) and non-salient pixel(s). Assume the 3D display (stereo or autostereo) has a 'usable' disparity range of [−40,40], and a 'sharp/pleasing' disparity sub-range of [−10, 10]. The mapping function has to map input depth values ([0,255]) to the display disparities.

Conventionally, without use of saliency, the input range [0,255] is mapped onto [−40,40]. A problem with such conventional mapping is that the extreme parts of this range are typically not very pleasing/comfortable to watch. For example, for an auto-stereoscopic display, they become less sharp. If then a face gets such 'extreme' disparity values, the resulting 3D image is not very pleasing to look at.

For the enhanced mapping we know the salient regions and their input depth values. The mapping function is dimensioned such that these values are warped onto the 'sharp/pleasing' disparity range ([−10,10]), as people will concentrate on those parts. For the rest of the image, the disparities are mapped to the 'usable' [−40,40] range.

A way to do this, is to create a joint histogram of input disparity values. Pixels outside the salient regions are directly added to the disparity histogram:

$h(d) += 1$ if p is a non-salient pixel, the formula indicating that the histogram "bin" for the value d is increased by one. For a pixel in the salient regions a different conversion is used. It is added to a different bin of the histogram. The combined histogram is used to perform the mapping.

In the example case, and using a linear mapping, we would get $h(4d) += 1$ if p is a salient pixel, the formula indicating that the "bin" for the value 4d (4 times d) is increased by one. Hence salient pixels are converted by a correction function before being entered in the combined histogram. By said correction function the salient pixel depth range is warped towards values that are four times their original values. By such calculation a combined histogram is formed for salient pixels and non salient pixels, the salient pixels having a first input conversion and the non-salient pixels having a second input conversion. The first input conversion for the salient pixels has the correction function, which is set in dependence of the sub-range with respect to the usable range.

In this way, we get a single histogram for all pixels together. We can then determine that we want to map certain percentiles onto the available range, e.g. we can map the 5%-percentile of the disparity histogram onto −40, and the 95%- percentile onto 40, and perform a linear mapping for intermediate values. It is noted that a small amount, about 10% in the example, of the disparity values will be outside the usable range of the display, but the large majority will be mapped to [−40,40]. In practice said small amount of disparity values may be clipped to fall within the usable range. Hence, the combined histogram depth range is mapped inside the display usable depth range, and the correction function effectively achieves that the first depth values in the salient range are warped towards the display depth sub-range.

In a further example the saliency data is expressed in a degree, e.g. a fraction value between one and zero. Respective histogram bins may be modified by said fraction. For example, the confidence value w∈[0,1] of the object detector can be taken into account, either by adjusting $\phi(d)$ or, preferably, by treating a pixel p as a partially salient pixel:

h(d)+=1−w for all p
h($\phi$(d))+=w for all p

In a further example embodiment, separate histograms for salient and non-salient values are calculated. Boundary values for the salient range are determined from the salient histogram, e.g. by the 5% and 95% percentiles. Subsequently, we map the salient disparity range to the 'sharp/pleasing' range, while mapping the remaining range to the 'usable' range. The remaining range will usually include two sub-ranges, a first sub-range of non-salient values higher than the upper boundary of the salient range, which is mapped on the range [10,40], and a second sub-range of non-salient values lower than the lower boundary of the salient range, which is mapped on the range [−40,−10]. Such mapping may then be a piecewise linear mapping, or a nonlinear mapping. An example of non-linear mapping is described below.

Optionally only salient pixels are entered into a histogram. The histogram of salient depth values is subsequently mapped onto the high-quality sub-range of the display. The remaining range of depth values is then mapped in the usable range, i.e. without determining the amount of non salient depth values that actually occur.

The following options may be considered for enhancing the temporal stability in practical circumstances.

For offline processing, it is possible to decide on a target range per shot. The temporal boundaries may be known or automatically determined using detection algorithms known as such. The above histograms may be calculated for the total length of the shot, e.g. taking a single mapping for the shot. Alternatively a small difference may be allowed to occur during the shot. A larger difference will occur at the shot boundary, but is likely invisible over a shot transition. Hence this disparity mapping will result in a stable and acceptable 3D experience.

For online processing, using suitable buffering it is possible to look ahead a couple of frames and base the target range on a (moving) window of frames.

For online processing when frames cannot be delayed, temporal stability may be enhanced by only allowing decreasing the range (reducing the depth) during a shot. Directly after a shot transition the range is reset. Alternatively a small and gradual increase of the range could also be allowed within shots.

Figure 5:
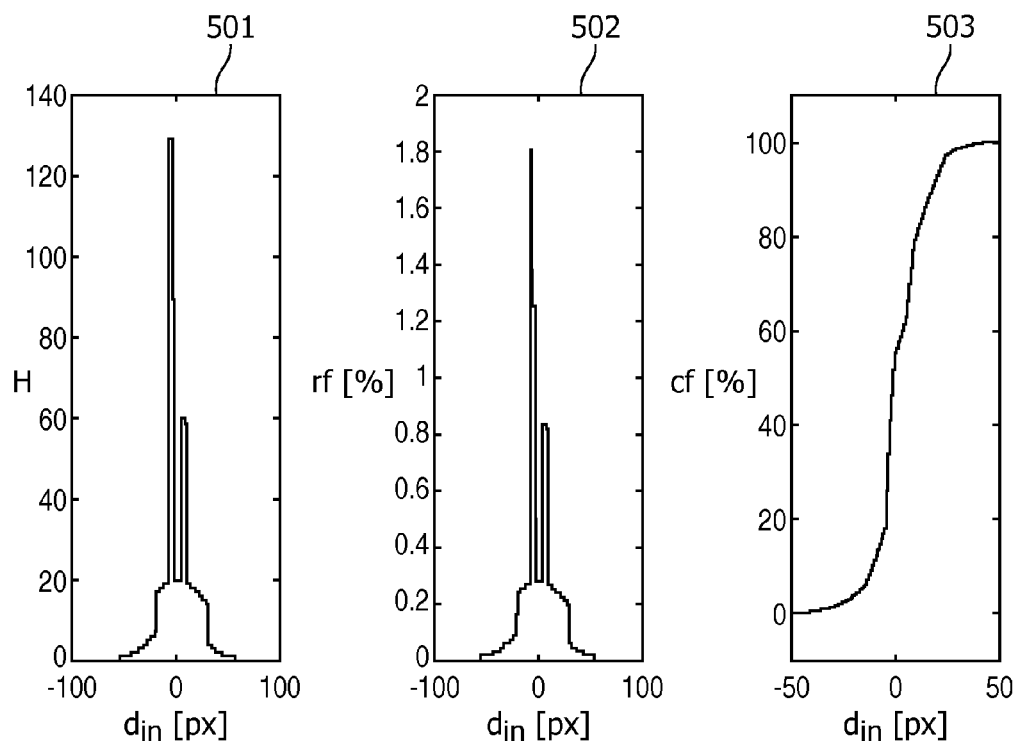
FIG. 5 shows non linear disparity mapping.

FIG. 5 shows non linear disparity mapping. The left diagram 501 shows a histogram of disparity values. The histogram is a combined histogram of salient and non-salient depth values having respective, different input conversion functions, as described above. The mid diagram 502 shows a normalized histogram, obtained by estimation of the relative frequencies, for continuous data also known as the probability density function (PDF). The right diagram 503 shows an estimate of the cumulative density function (CDF), obtained by integration or cumulative summing. A naïve way of non-linear mapping would be to scale CDF to the usable target range, for example $[d_{min}, d_{max}]=[-40, 40]$ as follows:

$$\phi(d)=CDF(d)\times(d_{max}-d_{min})+d_{min}=80*CDF(d)-40$$

The effect of naïve mapping is that disparities inside objects may be stretched and may cause visible distortion. A solution is a constrained mapping which limits the slope of the mapping, e.g. by $$\phi'(d)<=\text{max gain}$$

wherein max gain is a constant selected for setting a limit to said distortion.

Figure 6:
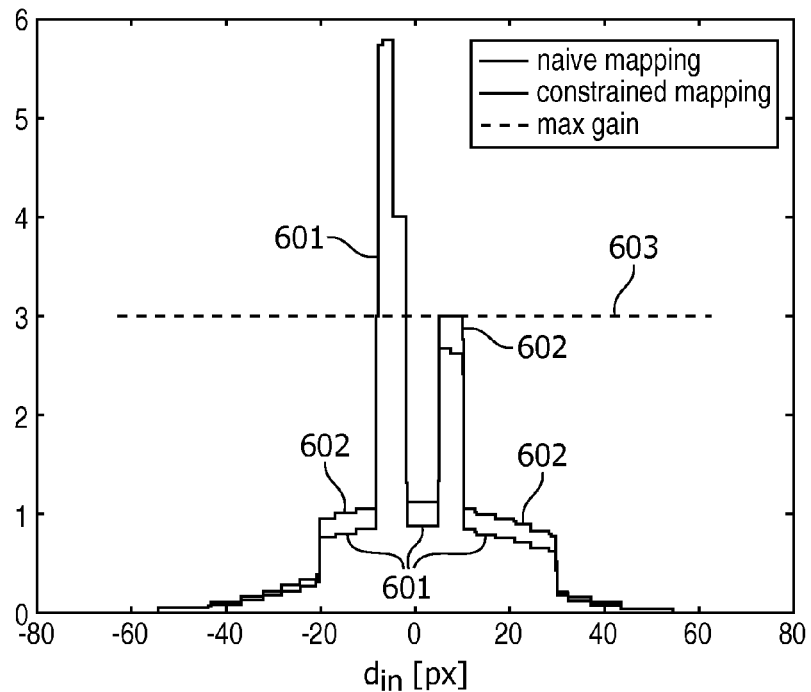
FIG. 6 shows a maximum gain constraint.

FIG. 6 shows a maximum gain constraint. The x-values are the target depth values, and the y-values are the input/output density proportional gain values. The naïve mapping 601 shows very high peak values of said gain. A maximum gain value 603 is indicated by a dashed line. The constrained mapping 602 does not extend above said maximum gain 603. In areas not having peak values to constrained mapping 602 is higher than the naïve mapping 601.

Figure 7:
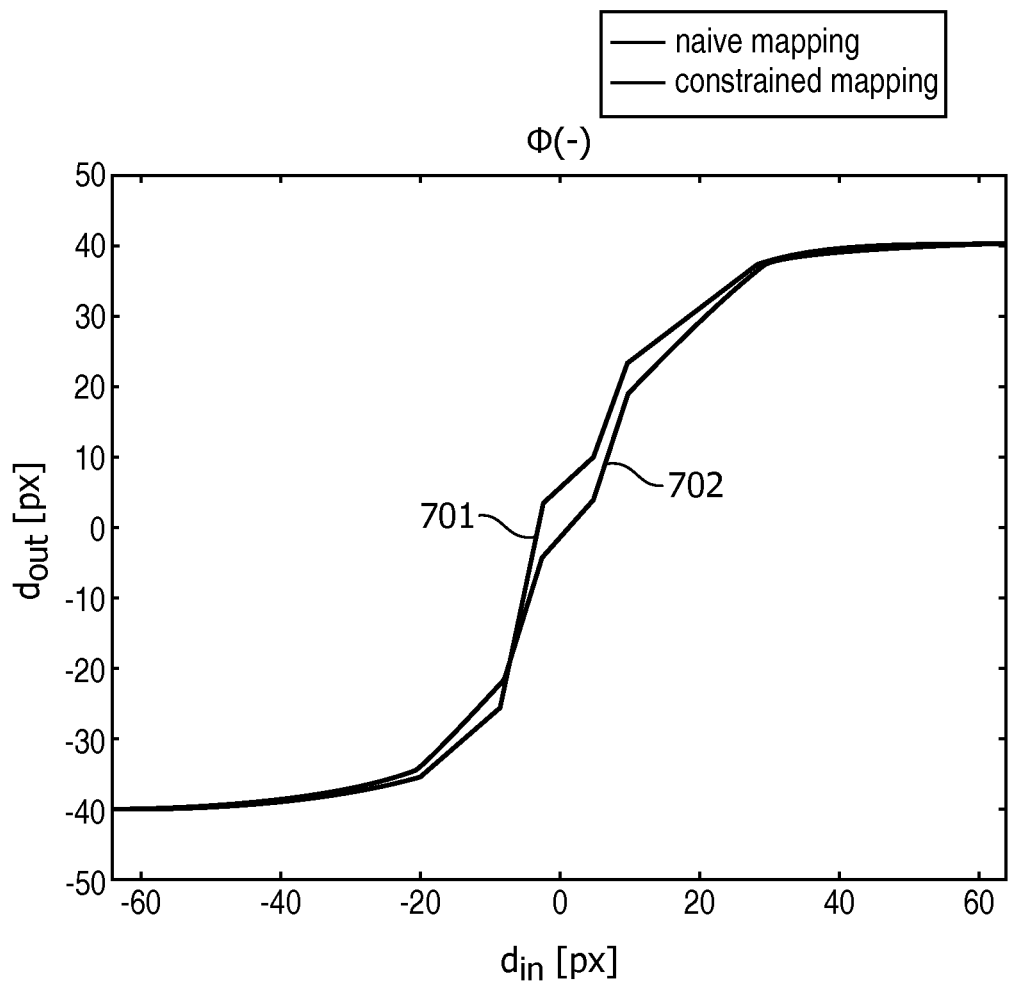
FIG. 7 shows enhanced non linear disparity mapping.

FIG. 7 shows enhanced non linear disparity mapping. The Figure shows the result of non linear mapping functions. A naïve curve 701 shows the basic non linear mapping (p(d) without maximum constraint, whereas the constrained mapping curve 702 shows enhanced non linear mapping $\phi'(d)$ with maximum constraint.

The following section provides a sample pseudo-code of the mapping function $\phi'(d)$ in 4 steps:

1. Input:
   a. naïve mapping phi'_naive, desired output range [d_min, d_max] and max. gain constraint maxgain
2. Initialization:
   a. phi' := phi'_naive (start with derivative of naïve mapping)
   b. last := { }
3. Iterate:
   a. saturated := {d|phi' (d) >= maxgain}
   b. Go to 4. when saturated = last
   c. last := saturated.
   d. phi'(d) := maxgain for all d in saturated (adjust the mapping for saturated regions)
   e. correction := (sum(phi'_naive) − sum_saturated(phi')) / sum_not saturated(phi')) (calculate a corrective gain for the unsaturated regions)
   f. phi'(d) := correction phi' for all d not in saturated (adjust mapping for unsaturated regions)
4. Complete:
   a. phi := integrate phi' + d_min
   b. phi := phi + (d_max − phi(∞)) / 2 (center the mapping range within the specified range)

It is noted that condition 4b occurs with no or few disparity in the source image material, e.g. during credit titles of a movie. Furthermore the sample algorithm will map the median disparity near the centre of the desired sub-range, which is generally preferred.

In summary, disparities have to be warped onto a usable range for optimal 3D viewing conditions on a specific 3D display. A single warping range is found to be suboptimal, resulting in either a too restricted range (little depth effect) or in a too broad range (disturbing blur of salient objects). We therefore propose a saliency-based warping of the input disparity range, where salient regions are warped onto a more restricted output sub-range of disparities, while non-salient regions can use the full, larger usable range of disparities.

The invention may be specifically applied in auto-stereoscopic display devices, such as lenticular or barrier-based multiview display devices, wherein the invention is used to convert mono/stereo content to multiple views for use with such displays.

Although the invention has been mainly explained by embodiments using 3D image signal transfer via an optical disc like BD, the invention is also suitable for any distribution of 3D video via a digital channel, e.g. DVB broadcast or the internet.

It will be appreciated that the above description for clarity has described embodiments of the invention with reference to functional units and processors. However, it will be apparent that any suitable distribution of functionality between different functional units or processors may be used without detracting from the invention. For example, functionality illustrated to be performed by separate units, processors or controllers may be performed by the same processor or controller. Hence, references to specific functional units are only to be seen as references to suitable means for providing the described functionality rather than indicative of a strict logical or physical structure or organization. The invention can be implemented in any suitable form including hardware, software, firmware or any combination of these.

Although in the above most embodiments have been given for devices, the same functions are provided by corresponding methods. Such methods may optionally be implemented at least partly as computer software running on one or more data processors and/or digital signal processors. The elements and components of an embodiment of the invention may be physically, functionally and logically implemented in any suitable way.

If a feature appears to be described in connection with particular embodiments, one skilled in the art would recognize that various features of the described embodiments may be combined in accordance with the invention. Individual features may be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example and shall not be construed as limiting the scope of the claims in any way.

The invention claimed is:

1. Method of processing a three dimensional (3D) image signal for rendering 3D image data on a 3D display based on multiple display views, the method comprising:
    deriving, from the 3D image signal, a first depth map comprising first depth values,
    deriving, from the 3D image signal, saliency data representing saliency in an amount of the 3D image data, the saliency being indicative of salient elements having a salient range of depth values,
    determining a depth mapping function for the amount of the 3D image data in dependence of the saliency data such that first depth values in the salient range of depth values are mapped towards a display depth sub-range, the display depth sub-range being a sub-range of a usable depth range of the 3D display and providing a higher 3D image quality for a viewer than the 3D image quality across the usable depth range, and wherein determining the depth mapping function comprises:
    making a combined histogram for salient depth values and non-salient depth values, wherein the salient depth values are weighted using a first input conversion weight before adding in the histogram and the non-salient depth values are weighted using a second input conversion weight before adding in the histogram, the first input conversion weight and the second input conversion weight in dependence of the display depth sub-range and the usable depth range of the 3D display,
    determining a combined histogram depth range, and
    mapping the combined histogram depth range inside the usable depth range of the 3D display, the first input conversion weight and the second input conversion weight being different and selected so that the first depth values in the salient range of depth values are warped towards the display depth sub-range,
    converting the first depth map into a second depth map by the depth mapping function for generating the display views in dependence of the second depth map.

2. Method as claimed in claim 1, wherein
the saliency data is a saliency map indicating a degree of saliency for pixels of the image, or
the saliency data is a saliency depth range.

3. Method as claimed in claim 1, wherein deriving saliency data comprises deriving meta data from the 3D image signal, the meta data representing the saliency data of the 3D image data.

4. Method as claimed in claim 1, wherein the amount of 3D image data is a period of a 3D video signal, and the depth mapping function depends on the saliency data across time.

5. Method as claimed in claim 4, wherein the depth mapping function comprises
    determining a shot as the period of the 3D video signal and setting the mapping function for the shot, or
    using a moving window having a look-ahead and setting the mapping function for the window.

6. 3D video device for processing a three dimensional (3D) image signal for rendering 3D image data on a 3D display based on multiple display views, the device comprising:
    processing device for
        deriving, from the 3D image signal, a first depth map comprising first depth values,
    and for
        deriving, from the 3D image signal, saliency data representing saliency in an amount of the 3D image data, the saliency being indicative of salient elements having a salient range of depth values, and
    a video processor arranged for
        determining a depth mapping function for the amount of the 3D image data in dependence of the saliency data such that first depth values in the salient range of depth values are mapped towards a display depth sub-range, the display depth sub-range being a sub-range of a usable depth range of the 3D display and providing a higher 3D image quality for a viewer than the 3D image quality across the usable depth range, and wherein determining the depth mapping function comprises:
            making a combined histogram for salient depth values and non-salient depth values, wherein the salient depth values are weighted using a first input conversion weight before adding in the histogram and the non-salient depth values are weighted using a second input conversion weight before adding in the histogram, the first input conversion weight and the second input conversion weight in dependence of the display depth sub-range and the usable depth range of the 3D display;
determining a combined histogram depth range, and mapping the combined histogram depth range inside the usable depth range of the 3D display, the first input conversion weight and the second input conversion weight being different and selected so that the first depth values in the salient range of depth values are warped towards the display depth sub-range,
converting the first depth map into a second depth map by the depth mapping function for generating the display views in dependence of the second depth map.

7. Device as claimed in claim 6, wherein the video processor is arranged for
generating the display views in dependence of the second depth map, and/or
the device comprises a 3D display for displaying the display views for the respective left and right eyes of a viewer, and/or
the video processor is arranged for determining the display depth sub-range by acquiring display capability information from a 3D display device connected to the 3D video device.

8. Device as claimed in claim 6, wherein said deriving saliency data comprises deriving meta data from the 3D image signal, the meta data representing the saliency data of the 3D image data.

9. Device as claimed in claim 6, wherein the processing device comprises:
an optical record carrier unit for retrieving the video information from an optical record carrier.

10. Computer-readable, non-transitory medium having stored therein instructions for causing a processing unit to execute a method of processing a three dimensional (3D) image signal for rendering 3D image data on a 3D display based on multiple display views the medium comprising code for:

deriving, from the 3D image signal, a first depth map comprising first depth values deriving, from the 3D image signal, saliency data representing saliency in an amount of the 3D image data, the saliency being indicative of salient elements having a salient range of depth values, determining a depth mapping function for the amount of the 3D image data in dependence of the saliency data such that first depth values in the salient range of depth values are mapped towards a display depth sub-range, the display depth sub-range being a sub-range of a usable depth range of the 3D display and providing a higher 3D image quality for a viewer than the 3D image quality across the usable depth range, and wherein determining the depth mapping function comprises:

making a combined histogram for salient depth values and non-salient depth values, wherein the salient depth values are weighted using a first input conversion weight before adding in the histogram and the non-salient depth values are weighted using a second input conversion weight before adding in the histogram, the first input conversion weight and the second input conversion weight in dependence of the display depth sub-range and the usable depth range of the 3D display, determining a combined histogram depth range, and mapping the combined histogram depth range inside the usable depth range of the 3D display, the first input conversion weight and the second input conversion weight being different and selected so that the first depth values in the salient range of depth values are warped towards the display depth sub-range, converting the first depth map into a second depth map by the depth mapping function for generating the display views in dependence of the second depth map.

\* \* \* \* \*